United States Patent [19]

Szybicki et al.

[11] 4,284,852

[45] Aug. 18, 1981

[54] ALTERNATE ROUTING FOR A TELEPHONE SYSTEM

[75] Inventors: Edmund Szybicki, Verdun; Maurice E. Lavigne, Orleans, both of Canada

[73] Assignee: Northern Telecom Limited, Montreal, Canada

[21] Appl. No.: 67,542

[22] Filed: Aug. 17, 1979

[30] Foreign Application Priority Data

Jun. 22, 1979 [CA] Canada .................................. 330426

[51] Int. Cl.³ .............................................. H04Q 3/54
[52] U.S. Cl. ............................................... 179/18 EA
[58] Field of Search .................................... 179/18 EA

[56] References Cited

U.S. PATENT DOCUMENTS

| | | | |
|---|---|---|---|
| 3,525,814 | 8/1970 | Cox | 179/18 ES |
| 3,560,663 | 2/1971 | Lee et al. | 179/18 EA |
| 3,591,724 | 7/1971 | Yaku et al. | 179/18 EA |
| 3,705,523 | 12/1972 | Alouisa | 179/18 EA |
| 3,916,124 | 10/1975 | Joel, Jr. | 179/18 GE |

FOREIGN PATENT DOCUMENTS

1487956 7/1973 Fed. Rep. of Germany ..... 179/18 EA
1078302 8/1967 United Kingdom ............... 179/18 EA

*Primary Examiner*—Thomas W. Brown
*Attorney, Agent, or Firm*—Robert C. Hogeboom

[57] ABSTRACT

An alternate routing scheme for a telephone system wherein a plurality of switching offices are grouped into a cluster, with each switching office in the cluster having direct trunk lines to all the other switching offices in its cluster. This allows each switching office in the cluster to serve the dual function both of an originating (or terminating) office and of a tandeming office for its own cluster. Suitable equipment monitors the busy status of all the switching offices in the cluster, and determines a most likely alternate routing scheme for each switching office. The alternate routing scheme for each particular switching office is stored at that particular office and is periodically updated, by suitable equipment, so as to account for changes in the busy status of the other switching offices and trunk lines in the cluster.

14 Claims, 6 Drawing Figures

$RTE

| | Z | Y | X |
|---|---|---|---|
| +73 | OTG = 99 | | $RTE = +74 |
| +74 | OTG = 0 | | |
| +75 | | | |
| +76 | | | |
| +77 | OTG = 47a | | $RTE = +79 |
| +78 | | | |
| +79 | | $DRCS = 2 | |

38a

| | Z | Y | X |
|---|---|---|---|
| +88 | OTG = 47c | | $RTE = +73 |

$DRCS

| 0 | $DRDS = 3 |
|---|---|
| 1 | $DRDS = 1 |
| 2 | $DRDS = 4 |
| 3 | $DRDS = 2 |
| 4 | $DRDS = 0 |
| 5 | |
| 6 | |
| 7 | |
| 8 | |

54

$DRDS

| | Z | Y | X |
|---|---|---|---|
| 0 | | | |
| 1 | | | |
| 2 | | | |
| 3 | | | |
| 4 | | | $RTE = +88 |
| 5 | | | |
| 6 | | | |
| 7 | | | |
| 8 | | | |

ALTERNATE ROUTING FOR A TELEPHONE SYSTEM

The invention relates generally to alternate routing in a telephone system, and more particularly to alternate routing that takes into account the status of the trunk lines in the network but does not employ separate dedicated tandem switching offices.

BACKGROUND OF THE INVENTION

In normal analogue telephone switching offices, the routing of inter-office telephone calls takes place over fixed paths referred to as trunk lines (or trunks). Only a finite number of direct trunk lines exist between any two telephone switching offices and it is not uncommon to find that no idle direct trunk lines are available between the two switching offices. At this point, the next step is normally to select an idle outgoing trunk to a tandem switching office. The call arrives at this tandeming or intermediate office on an incoming trunk and is then redirected, or tandemed, to an idle outgoing trunk destined for the terminating office. The originating office is operating under the basic assumption that an idle outgoing trunk exists between the tandem office and the terminating office. A blockage in the tandeming office, because of no idle outgoing trunks to the terminating office, wastes processing time in both the originating and the tandeming offices.

Normally, the trunk routing from the originating office to the terminating office is fixed by the system design. That is to say, the originating office follows a fixed routing hierarchy to select an idle trunk. The originating office first attempts to find an idle direct trunk to the terminating office; if there are no idle direct trunks, the originating office attempts to find an idle outgoing trunk to a tandem office according to the system hierarchy. If there are no idle outgoing trunks to a tandem office the calling subscriber who originated the call receives an overflow (e.g. fast busy) signal.

The present invention alleviates some of the problems of this regimented hierarchial type of routing by grouping a plurality of switching offices (e.g. class 5 stored program control offices) into clusters and by providing each switching office with direct trunks to all (or most of) the other switching offices in its cluster. This then allows each switching office in the cluster to serve the dual function both of an originating (or terminating) office and of a tandeming office for its own cluster. Suitable equipment monitors the busy status of all the switching offices in the cluster, and determines a most likely alternate routing scheme for each switching office. The alternate routing scheme for each particular switching office is stored at that particular office and is periodically updated, by suitable equipment, so as to account for changes in the busy status of the other switching offices and trunk lines in the cluster.

Stated in other terms, the present invention is an alternate routing system for a plurality of telephone switching offices, the system comprising: at least one group of trunk lines connecting any one switching office in the system to any other switching office in the system; a first plurality of storage locations, at each switching office, for storing an indication of the terminating office to which a call is directed; a second plurality of storage locations, at each switching office, for storing an indication of the switching office most likely to be available as a tandeming office between the originating switching office and the terminating switching office; a third plurality of storage locations, at each switching office, for storing an indication of the trunk lines to be used for accessing the switching office indicated by the second plurality of storage locations as being the tandeming office; and apparatus for periodically updating the information stored in the second plurality of storage locations, concerning the switching office to be employed as a tandeming office.

Stated in yet other terms, the present invention is an alternate routing system for a plurality of telephone switching offices, the system comprising: at least one group of trunk lines connecting any one switching office in the system to any other switching office in the system; each switching office including a first plurality of storage locations, a second plurality of storage locations, and a third plurality of storage locations; the first plurality of storage locations, at each switching office, storing, as an addressed location for the second plurality of storage locations, an indication of the terminating office to which a call is directed; the second plurality of storage locations, at each switching office, storing, as an addressed location for the third plurality of storage locations, an indication of the switching office most likely to be available as a tandeming office between the originating switching office and the terminating switching office; the third plurality of storage locations, at each switching office, storing, as an addressed location for the first plurality of storage locations, an indication of the trunk lines to be used for accessing the switching office indicated as being the tandeming office by the second plurality of storage locations; and apparatus for periodically updating the information stored in the second plurality of storage locations, concerning the switching office to be employed as a tandeming office.

Stated in yet again different terms, the present invention is an alternate routing method for a plurality of telephone switching offices interconnected in a system configuration wherein any two switching offices in the system are interconnected by at least one group of trunk lines, the method, at an originating switching office, comprising: storing, in a first addressable storage location, an address indicative of a terminating switching office; storing, in a second addressable storage location addressed by the contents of the first storage location, an address indicative of a tandeming switching office to be employed intermediate said originating and terminating switching offices; storing, in a third addressable storage location addressed by the contents of the second storage location, an address indicative of trunk lines to be employed in accessing the tandeming switching office; and periodically updating the information stored in the second addressable storage location.

BRIEF DESCRIPTION OF THE DRAWINGS

The invention will now be described in greater detail with reference to the accompanying drawings, wherein like parts in each of the several figures are identified by the same reference character, and wherein.

DETAILED DESCRIPTION

Figure 1:
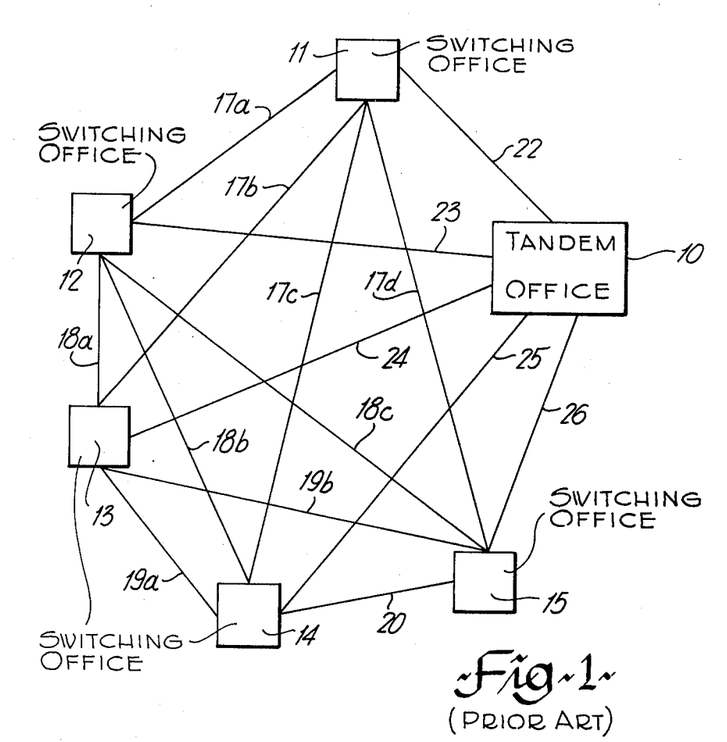
FIG. 1 is a simplified block diagram of a prior art telephone switching system including a tandem office.

In FIG. 1 there is depicted, in simplified block diagram form, a tandem office 10 and five local switching offices indicated by the reference numerals 11, 12, 13, 14 and 15. A direct outgoing trunk group (OTG) 17a, comprising a plurality of direct trunk lines, connects switching office 11 to switching office 12. Similarly, direct outgoing trunk groups 17b, 17c, and 17d connect switching office 11 to switching offices 13, 14, and 15 respectively, as shown in FIG. 1. Direct outgoing trunk groups 18a, 18b, and 18c connect switching office 12 to switching offices 13, 14, and 15 respectively, as shown in FIG. 1. Direct outgoing trunk groups 19a and 19b connect switching office 13 to switching offices 14 and 15 respectively, as shown in FIG. 1, and direct outgoing trunk group 20 connects switching offices 14 and 15. An alternate outgoing trunk group (OTG) 22, comprising a plurality of alternate trunk lines, connects switching office 11 to tandem office 10. Similarly, alternate outgoing trunk groups 23, 24, 25 and 26 connect switching offices 12, 13, 14 and 15 respectively, to tandem office 10.

As an example of operation, if switching office 12 were to communicate with switching office 13, office 12 first attempts to establish a communication path via one of the trunks comprising outgoing trunk group 18a; this is referred to as a "direct route". If this direct route (i.e. outgoing trunk group 18a) is busy (i.e. no idle trunk lines are available), switching office 12 attempts to establish the communication path via an "alternate route". This alternate route comprises outgoing trunk group 23, tandem office 10, and outgoing trunk group 24. This alternate route is possible so long as neither outgoing trunk group 23 nor outgoing trunk group 24 are busy.

Figure 2:
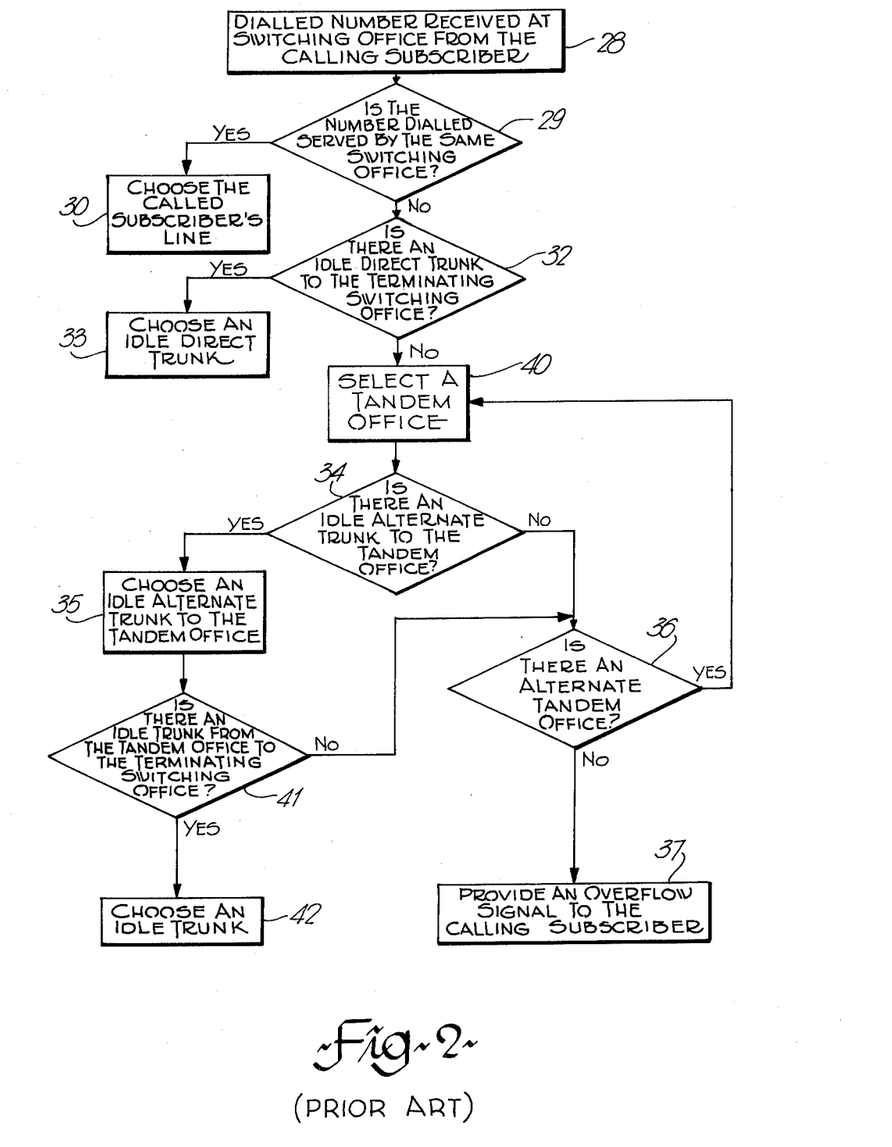
FIG. 2 is a flow chart depicting, in simplified form, the typical operations of establishing an inter-office connection, including a tandem (or alternate) route, according to the prior art.

FIG. 2, which is a flow chart depicting, in simplified form, the typical operations of establishing an inter-office connection, including an alternate route, will now be discussed with reference to the system depicted in FIG. 1. It is believed that FIG. 2 is self-explanatory, so it will not be described in great detail. Function box 28 indicates that a telephone number dialled by a calling subscriber has been received at a switching office (e.g. office 12). Decision box 29 indicates that a decision is made as to whether the telephone number dialled (i.e. the telephone number of the called subscriber) indicates another subscriber also served by switching office 12 or by a different switching office (e.g. switching office 13, FIG. 1). If the answer to the question in box 29 is yes, then function box 30 is accessed which connects the call to the called subscriber in a standard fashion. If the answer to the question in box 29 is no, then decision box 32 is accessed.

Decision box 32 questions whether or not there is an idle direct trunk from switching office 12 to switching office 13 (i.e. is one of the trunks in outgoing trunk group 18a, of FIG. 1, idle?). If the answer to this question is yes, then function box 33 is accessed and an idle direct trunk is chosen. If the answer to the question in box 32 is no, then decision box 34 is accessed via function box 40.

Decision box 34 questions whether or not there is an idle alternate trunk from switching office 12 to tandem office 10 (i.e. is one of the trunks in outgoing trunk group 23, of FIG. 1, idle?). If the answer to this question is yes, then function box 35 is accessed and an idle alternate trunk to the tandem office is chosen. If the answer to the question in box 34 is no, then function box 36 is accessed. Function box 36 asks the question "Is there an alternate tandem office?"; if the answer is no, then box 37 is accessed in order to provide an overflow (e.g. fast busy) signal to the calling subscriber, which results in the telephone call being terminated. If the answer for box 36 is yes, then function box 40 is accessed which results in the selection of an alternate tandem office, and decision box 34 is then re-entered and the decision process proceeds as depicted.

Returning to function box 35, box 35 chooses an alternate trunk to tandem office 10, and then decision box 41 is accessed. Decision box 41 asks the questions "Is there an idle trunk from the tandem office to the terminating switching office?". In our example, this refers to any idle trunk lines in OTG 24 between tandem office 10 and switching office 13. If the answer to box 41 is yes, then function box 42 is accessed and an idle trunk is chosen. If the answer to box 41 is no, function box 36 is accessed and the procedure previously described is followed.

Figure 3:
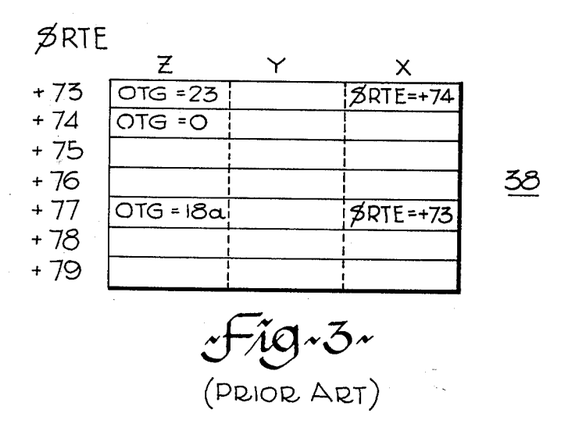
FIG. 3 is a simplified pictorial representation of an addressable storage device, according to the prior art, that implements the operation that is depicted in flow chart form in FIG. 2.

FIG. 3 is a simplified pictorial representation of a prior art addressable storage device 38 that implements some of the functions depicted in FIG. 2, commencing with decision box 32 and including boxes 33, 34, 35, and 37 of FIG. 2. Storage device 38 is addressed by referring to storage device 38 by the characters $RTE and the specific addressed location within storage device 38 by a reference off-set character between +73 and +79 consecutively (for the portion of storage device 38 depicted in FIG. 3). For example, the address " $ RTE= +73" addresses the first line of storage device 38 depicted in FIG. 3. " $RTE= +74" addresses the second line of storage device 38, etc.

The operation of storage device 38 can be explained as follows. When it is determined that the called subscriber is not served by the same switching office that serves the calling subscriber, addressable storage device 38 is accessed at addressed location " $RTE= +77". As can be seen from FIG. 3, this location contains "OTG=18a . . . $RTE= +73". The part "OTG=-18a" is contained in the first (or Z) portion of the addressed location and contains the information regarding the direct trunk lines to the switching office dialled. In this case, the stored information says to try to select an idle direct trunk in outgoing trunk group (OTG) 18a. The Y portion of the addressed location is not pertinent to our discussion and accordingly is omitted. The X portion of the addressed location stores the alternate route data, and in this example it says to try, as an alternate route, the outgoing trunk group (OTG) referenced by address location $RTE= +73. Addressed location $RTE= +73 indicates by its Z portion that the direct trunk to try is outgoing trunk group 23 (which is a trunk group to the tandem office 10), and if this is busy try the alternate route stored in address location $ RTE= +74. This last address location (i.e. $ RTE= +74) indicates an outgoing trunk group zero, which simply applies an overflow (e.g. fast busy) signal to the calling subscriber. While the foregoing description of one prior art alternate routing system has been simplified, in the interest of clarity, it should be noted that storage device 38, at switching office 12, can be made to accommodate the functions of boxes 36 and 40 (and typically would do so). The functions of boxes 41 and 42 would of course be handled by suitable equipment at tandem office 10.

The foregoing description of FIG. 3 is a simplified description of the routing scheme used in the switching office sold by Northern Telecom Limited under the trademark SP-1; for further reference to the SP-1 switching office see Northern Electric *Telesis*, January 1969, Volume 1, Number 4. Note that in the FIG. 3 embodiment the alternate routing follows a fixed routing path. That is, a direct route is tried and if this direct route is busy a certain (predetermined) alternate route is tried; if the predetermined alternate route is busy, an overflow (e.g. fast busy) signal is supplied to the calling subscriber.

Figure 4:
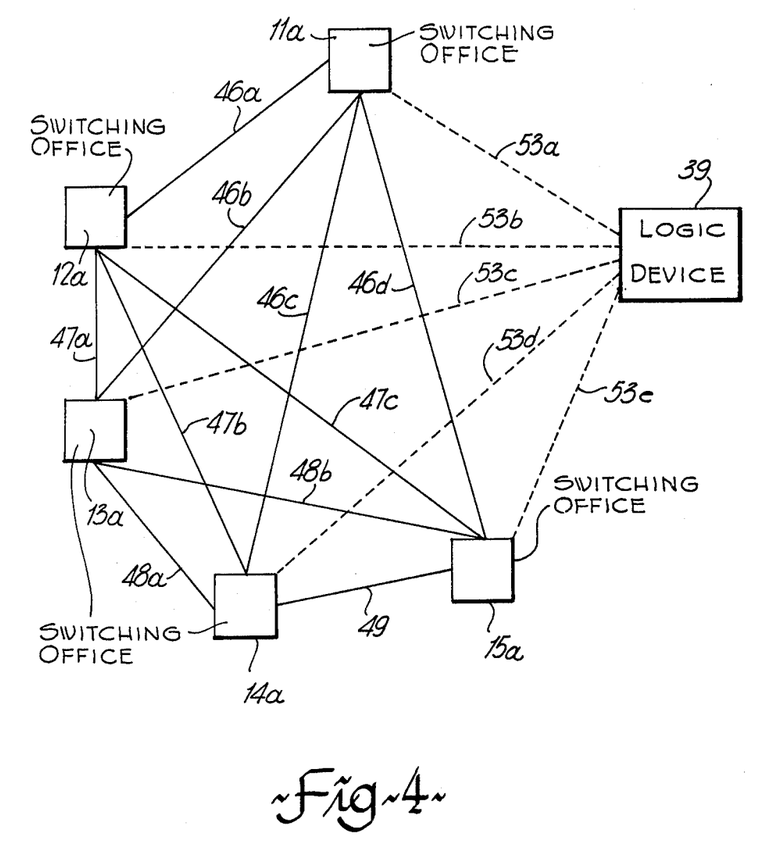
FIG. 4 is a simplified block diagram of a telephone switching system constructed according to the preferred embodiment of the present invention.

FIG. 4 depicts local switching offices 11a, 12a, 13a, 14a and 15a similar to those of FIG. 1, but interconnected according to the preferred embodiment of the present invention and functioning under the control of logic device 39. The direct outgoing trunk groups 46a, 46b, 46c, 46d, 47a, 47b, 47c, 48a, 48b and 49 are similar to the direct outgoing trunk groups of FIG. 1. Note however, that FIG. 4 employs neither the tandem office 10 (FIG. 1) nor the alternate outgoing trunk groups 22, 23, 24, 25 or 26 of FIG. 1. Rather, the FIG. 4 embodiment employs only direct trunk lines from each switching office 11a, 12a, 13a, 14a, and 15a to every other switching office 11a, 12a, 13a, 14a and 15a under the supervision of logic device 39. Logic device 39 receives information from switching offices 11a, 12a, 13a, 14a and 15a and transmits information to switching offices 11a, 12a, 13a, 14a and 15a via data links 53a, 53b, 53c, 53d and 53e, respectively.

The information that logic device 39 receives from each of the switching offices 11a, 12a, 13a, 14a and 15a is information regarding how busy each switching office is. The information required in the preferred embodiment (both directly measured data and derived data) includes the number of trunks in a considered outgoing trunk group, the number of occupied (busy) trunks in the considered outgoing trunk group, the total average call intensity for the considered outgoing trunk group, the average time per conversation, the time period over which the information is collected, and the expected number of idle trunk lines needed in the trunk group for other than alternately routed calls. Employing this information, logic device 39 determines the most likely alternate routes between the switching offices 11a, 12a, 13a, 14a and 15a and stores the alternate route information for a particular switching office at that particular switching office. This will be explained in greater detail later.

As an example, suppose that switching office 12a wants to access switching office 13a. If the direct trunk lines in outgoing trunk group 47a are busy, an alternate route must be chosen. Possible alternate route would include: (a) outgoing trunk group 47b to switching office 14a and then outgoing trunk group 48a to switching office 13a; (b) outgoing trunk group 47c to switching office 15a and then outgoing trunk group 48b to switching office 13a; and (c) outgoing trunk group 46a to switching office 11a and then outgoing trunk group 46b to switching office 13a. The function of logic device 39 is to determine which one of these alternate routes is the route most likely to be employed. This alternate route data is then stored in switching office 12a for future reference whenever it has to access switching office 13a via an alternate route. This alternate route information is periodically updated to ensure that it is current (e.g. every 5 to 15 seconds the alternate route data is updated). The frequency of this updating of the alternate route is a design variable dependent upon the number of switching offices in the alternate routing configuration, upon the amount of traffic being handled (i.e. in busy time periods it is desirable to update the alternate route information more frequently than otherwise), upon the speed of transmission of the data between the switching offices and logic device 39, along data links 53a, 53b, 53c, 53d and 53e, upon the speed of logic device 39, and upon design philosophy, etc.

Figure 5:
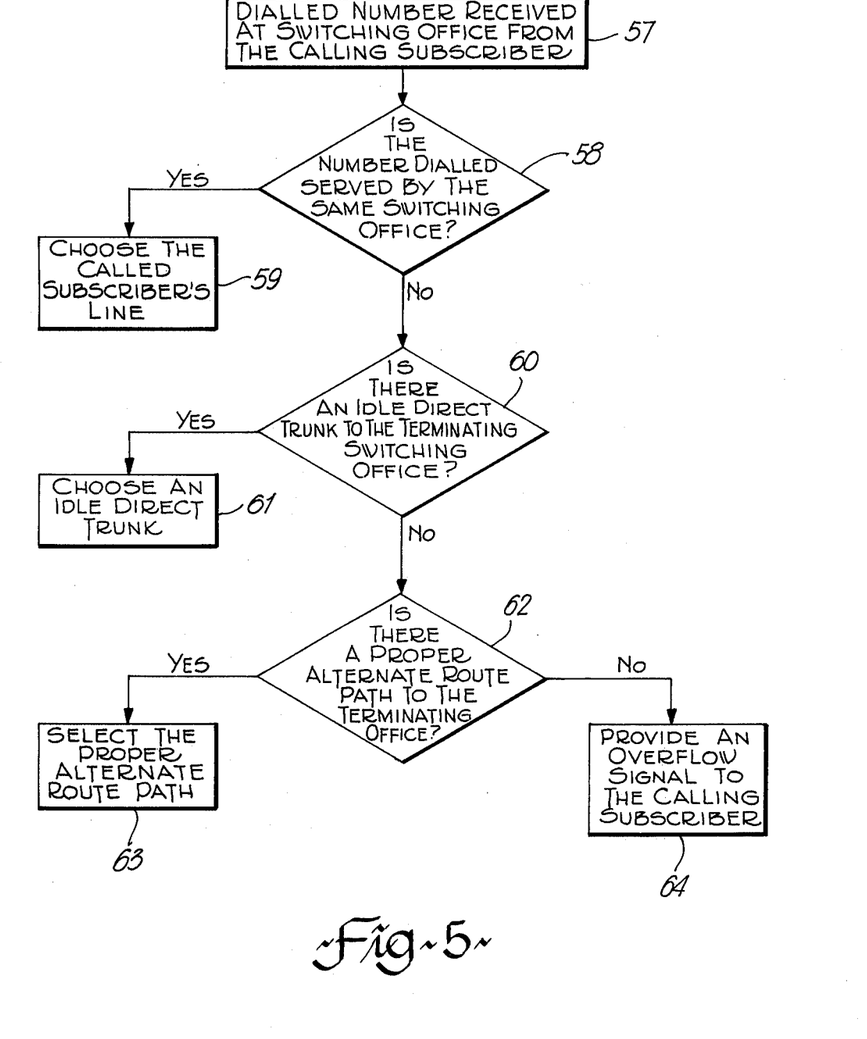
FIG. 5 is a flow chart depicting, in simplified form, the operations of establishing an inter-office connection, including a tandem (or alternate) route, according to the present invention.

The operation of the present invention follows the scheme depicted, in simplified form, by the flow chart of FIG. 5. It is believed that FIG. 5 is self-explanatory, so it will not be described in great detail. Function box 57 indicates that a telephone number dialled by a calling subscriber has been received at a switching office (e.g. office 12a). Decision box 58 indicates that a decision is made as to whether the telephone number dialled (i.e. the telephone number of the called subscriber) indicates another subscriber also served by switching office 12a or by a different switching office (e.g. switching office 13a, FIG. 4). If the answer to the question in box 58 is yes, then function box 59 is accessed which connects the call to the called subscriber in a standard fashion. If the answer to the question in box 58 is no, then decision box 60 is accessed.

Decision box 60 indicates that a decision is made as to whether or not there is an idle direct trunk from the originating switching office (e.g. office 12a) to the terminating switching office (e.g. office 13a); in other words, is one of the trunks in outgoing trunk group 47a, of FIG. 4 idle? If the answer to this question is yes, then function box 61 is accessed and an idle direct trunk is chosen. If the answer to the question in box 60 is no, then decision box 62 is accessed.

Decision box 62 indicates that a decision is made as to whether or not there is a "proper" alternate route path from the originating switching office (e.g. office 12a) to the terminating switching office (e.g. office 13a) via a tandeming switching office (e.g. offices 11a, 14a, or 15a). Note that the choice of a "proper" alternate route path is made by logic device 39 (FIG. 4) and is then stored in the originating switching office (e.g. office 12a) for future reference. If the answer to the question in box 62 is yes, then function box 63 is accessed and the "proper" alternate route path is selected. If the answer to the question is box 62 is no, then function box 64 is accessed and an overflow signal (e.g. fast busy) is provided to the calling subscriber. Note that due to the fact that box 62 operates on past data, it may provide a yes response and access box 63 when in fact there are no proper alternate paths. This will occur very infrequently, but when it does, box 63 will provide an overflow signal to the calling subscriber.

Figure 6:
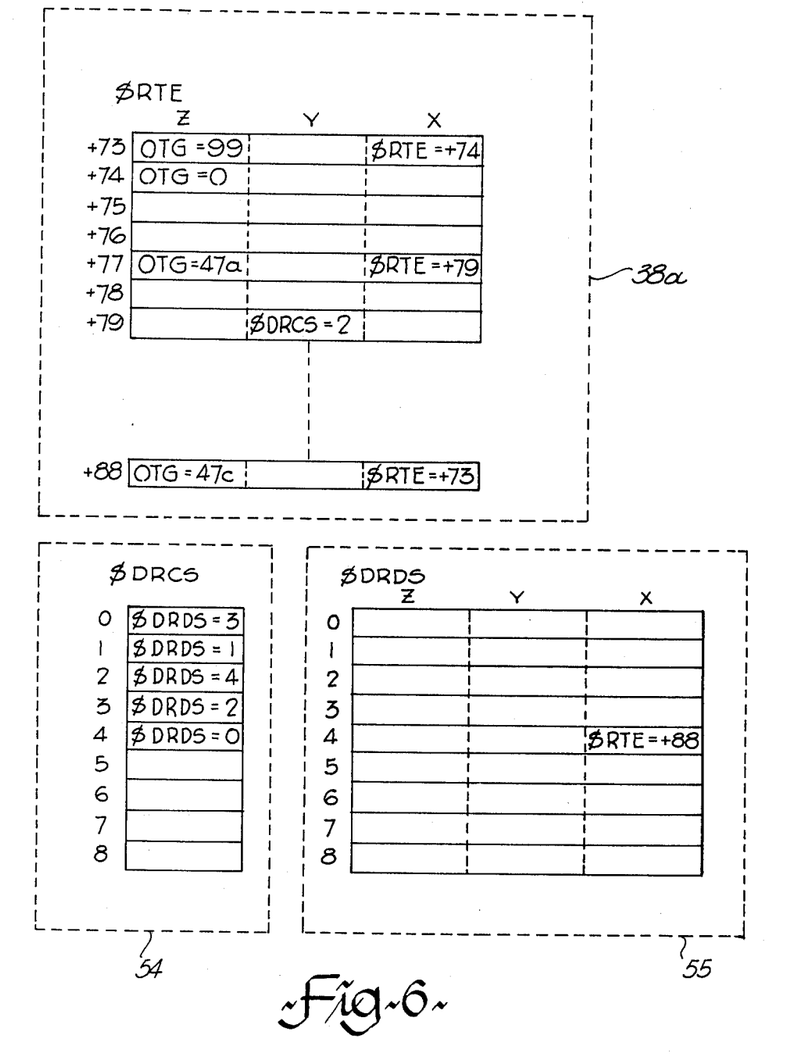
FIG. 6 is a simplified pictorial representation of addressable storage devices that are employed in the present invention, and that implement the operation that is depicted in flow chart form in FIG. 5.

FIG. 6 is a pictorial representation of addressable storage device 38a, addressable storage device 54, and addressable storage device 55 that implement the functions depicted in FIG. 5, commencing with decision box 60 and including boxes 61, 62, 63 and 64 of FIG. 5. Storage device 38a is addressed in the same manner as was storage device 38 of FIG. 3. In the preferred embodiment, storage devices 38a, 54 and 55 are random access memories (RAM).

Still supposing that switching office 12a wants to access switching office 13a, the operation of storage devices 38a, 54 and 55 can be explained as follows. When it is determined that the called subscriber is not served by the same switching office as the calling subscriber, storage device 38a is accessed at addressed location " $RTE=+77$". As can be seen from FIG. 6, this location contains "OTG=47a ... $RTE=+79$". The part "OTG=47a" is contained in the first (or Z) portion of the addressed location and contains the information regarding the direct trunk lines to the switching office dialled. In this case the stored information says to try to select an idle trunk in outgoing trunk group (OTG) 47a. Note that storage devices 38 (FIG. 3) and 38a (FIG. 6) are physically identical; the differences are that a greater portion of storage device 38a is depicted, and the information stored in devices 38 and 38a differs.

The Y portion of this particular addressed location in FIG. 6 (i.e. $ RTE=+77) is not pertinent to our discussion and accordingly is omitted. The X portion of this addressed location stores the alternate route information, and in this example it says to access the location addressed by " $RTE=+79$". We see that this addressed location contains nothing pertinent in the Z and X portions of the addressed location but contains the information " $DRCS=2$" in the Y portion of the addressed location. This is an address for storage device 54. Briefly stated, this addressed location in storage device 54 contains the information " $DRDS=4$" which is a storage location address for storage device 55, and storage device 55 stores the information regarding the trunk group which is to be accessed for the alternate group.

In more detail, the addressed locations $DRCS=0, $DRCS=1, $DRCS=2, $DRCS=3, and $DRCS=4 correspond to switching offices 11a, 12a, 13a, 14a, and 15a respectively. The addressed locations $DRDS=0, $DRDS=1, $DRDS=2, $DRDS=3, and $DRDS=4 also correspond to switching offices 11a, 12a, 13a, 14a and 15a respectively. In simplistic terms the operation of FIG. 6 can be explained as follows. If outgoing trunk group 47a is busy, then an alternate route, addressed by $RTE=+79 is accessed. This addressed location gives an address in storage device 54 ($DRCS=2) which says in effect we are trying to get to switching office 13a (since $DRCS=2 corresponds to switching office 13a). Storage device 54 has stored in it at this addressed location information which is indicative of the switching office which will be employed as a tandeming office. This tandeming office is addressed as $DRDS=4 (corresponding to switching office 15a) as shown by the information stored in storage device 54. When the addressed location in storage device 55 is found, it can be seen that the information " $RTE=+88$" is stored therein. This information is, of course, an address for storage device 38a.

The storage location, in storage device 38a addressed by $RTE=+88, contains the information that outgoing trunk group (OTG) 47c is the trunk group to be used for gaining access to switching office 15a (i.e. the tandeming office). If trunk group 47c should prove to be busy, then the storage location addressed by the X portion of addressed location $RTE=+88 (i.e. $RTE=+73) is accessed. Addressed location $RTE=+73 contains information on an outgoing trunk group (OTG=99, not shown) that is linked to a conventional tandem office (such as tandem office 10 in FIG. 1). The call under consideration is then routed to this tandem office (not shown) and completed in a conventional fashion. If this trunk group 99 is also busy, the X portion of the addressed location $RTE=+73 gives another address $RTE=+74 to be tried. This last address directs the equipment to access outgoing trunk group (OTG) O which simply supplies an overflow signal to the calling subscriber who originated the call.

To summarize the operation of FIG. 6 in simplistic terms, storage device 38a first tries to have a direct trunk connection between the originating and terminating offices (i.e. between switching offices 12a and 13a in this example) established. If this fails (due to the direct trunks being busy), storage device 38a "asks" storage device 54 for the switching office most likely to be available to act as a tandeming office. In the present example storage device 38a states, via addressed location $RTE=+79, that office 13a ($DRCS=2) is the terminating office for the telephone call. Storage device 54 states that to get to office 13a (indicated by its address $DRCS=2) the most likely alternate route is via switching office 15a (i.e. $DRDS=4; the contents stored in addressed location $DRCS=2 of storage device 54). Addressed location $DRDS=4, in storage device 55, states that addressed location $RTE=+88 in storage device 38a should be accessed to provide information on the outgoing trunk group.

It should be noted that the contents of storage devices 38a and 55 are fixed due to the system configuration, and do not normally change. The contents of storage device 54, however, are frequently being updated by logic device 39 (FIG. 4) in view of changing load conditions at the different switching offices 11a, 12a, 13a, 14a and 15a. For example, storage device 54 in the example given previously showed that if switching office 13a ($DRCS=2) were the terminating office, the most likely alternate route would be via switching office 15a (given by the stored contents $DRDS=4). However, at a later point in time the most likely route may be via switching office 14a at which time the stored contents in storage device 54 at addressed location $DRCS=2 would be $DRDS=3. Note also that there are nine addressable locations depicted in storage device 54 and only five of these locations are used. In an actual experiment conducted by the inventors, nine local switching offices were used; however, in order to simplify the description herein, only five have been shown. In storage device 55 only the stored information pertaining to the example has been given; similar information is stored in the X portions of the remaining addressable locations; the information stored in portions Z and Y is not pertinent to our discussion and accordingly has been omitted in the interests of simplicity and clarity.

Attention will now be directed to how logic device 39 (FIG. 4) determines the most likely alternate route for each switching office 11a, 12a, 13a, 14a and 15a.

One method of determining the alternate routing is as follows. For exemplary purposes switching office 12a of FIG. 4 will be considered to be the originating office and switching office 13a will be considered to be the terminating office, and all the trunk lines in outgoing trunk group 47a will be considered busy (not available).

Let $M_{op}$=the number of available (idle) trunk lines between originating office 12a and a potential tandeming switching office (e.g. offices 11a, 14a or 15a).

Let $M_{pt}$=the number of available (idle) trunk lines between the potential tandeming office (e.g. offices 11a, 14a or 15a) and terminating office 13a.

For each potential alternate route the number of complete available trunk lines (i.e. $M_c$) is calculated. The number of complete available trunk lines ($M_c$) is defined as the lesser of the numbers $M_{op}$ and $M_{pt}$ for a given alternate route, less the positive number Z. The switching office in the potential alternate route having the largest number $M_c$ is chosen as the tandeming switching office (if $M_c \leq 0$, then that office is not chosen as the tandeming switching office even if it has the largest Mc value). As an example assume that the following number of trunk lines are available.

| Trunk Group (FIG. 4) | Number of Available Trunk Lines ($M_{op}$) |
| --- | --- |
| 46a | 5 |
| 47b | 1 |
| 47c | 8 |

| Trunk Group (FIG. 4) | Number of Available Trunk Lines ($M_{pt}$) |
| --- | --- |
| 46b | 3 |
| 48a | 6 |
| 48b | 6 |

The number of complete available trunk lines ($M_c$) is determined as follows:

$$M_c = M_{op} - Z \quad \text{(for } M_{op} < M_{pt}\text{)};$$

$$M_c = M_{pt} - Z \quad \text{(for } M_{pt} < M_{op}\text{); and}$$

$$M_c = M_{pt} - Z = M_{op} - Z \quad \text{(for } M_{pt} = M_{op}\text{).}$$

Continuing the example of choosing an alternate route from switching office 12a to 13a it can be seen that there are three potential alternate routes comprising:

Route 1: trunk 46a, office 11a, trunk 46b;
Route 2: trunk 47b, office 14a, trunk 48a;
Route 3: trunk 47c, office 15a, trunk 48b.

It can be seen that for route 1, $M_{op}=5$, and $M_{pt}=3$. Accordingly, $M_c = M_{pt} - 2 = 3 - 2 = 1$ (for $Z=2$).

It can be seen that for route 2, $M_{op}=1$, and $M_{pt}=6$. Accordingly, $M_c = M_{op} - 2 = 1 - 2 = -1$ (for $Z=2$; and since the result is negative this route will not be chosen).

It can be seen that for route 3, $M_{op}=8$, and $M_{pt}=6$. Accordingly, $M_c = M_{pt} - 2 = 6 - 2 = 4$ (for $Z=2$).

Therefore route 3 is chosen as the most likely alternate route since it has the highest $M_c$ of all the possible alternate routes.

This information (i.e. that switching office 15a is the most likely alternate tandeming office) is transmitted by logic device 39 over data link 53b and is stored in storage device 54 (FIG. 6) of switching office 12a in the storage location addressed by $DRCS=2.

An alternate (and the preferred) method of determining the alternate route is as follows:

Let: $P_{op}$ be a number associated with the trunk lines connecting the originating switching office 12a and a potential tandeming office (i.e. offices 11a, 14a, or 15a).

Let: $P_{pt}$ be a number associated with the trunk lines connecting a potential tandeming switching office (e.g. offices 11a, 14a or 15a) and terminating office 13a.

and in the general case:

$$P = N - V - \left( Y \times T - \frac{V}{S} \times T \right) - X$$

where: N=the total number of trunk lines between the two considered switching offices (both busy and idle);

V=the number of occupied (busy) trunk lines between the two considered switching offices;

Y=the total average call intensity for the trunk lines between the two considered switching offices;

T=the length of time of the update period under consideration;

S=the estimated average duration of each occupation of the trunk lines between the two considered switching offices, during the time period under consideration;

X=the expected number of idle trunk lines needed between the two considered switching offices during the time period under consideration for other than alternately routed calls. The value X can be predetermined manually or can be determined automatically from actual traffic parameters.

As before, there are three potential alternate routes between offices 12 and 13a; they are:

Route 1: trunk 46a, office 11a, trunk 46b;
Route 2: trunk 47b, office 14a, trunk 48a;
Route 3: trunk 47c, office 15a, trunk 48b.

Hypothetical data, useful for illustrating the required calculations, is as follows:

| Trunk Group | N | V | Y(calls/sec.) | T(sec.) | S(sec.) | X |
| --- | --- | --- | --- | --- | --- | --- |
| 46a | 17 | 12 | 0.4 | 5.0 | 60.0 | 1 |
| 47b | 15 | 49 | 0.1 | 5.0 | 245.0 | 0 |
| 47c | 49 | 41 | 0.6 | 5.0 | 205.0 | 3 |
| 46b | 46 | 43 | 0.1 | 5.0 | 215.0 | 1 |
| 48a | 19 | 13 | 0.3 | 5.0 | 113.0 | 2 |
| 48b | 51 | 45 | 0.4 | 5.0 | 225.0 | 1 |

From this data the values of $P_{op}$ and $P_{pt}$ for each potential alternate route can be determined from the appropriate formula. It can be seen that for route 1 (trunk 46a):

$$P_{op} = N - V - \left( Y \times T - \frac{V}{S} \times T \right) - X$$

$$= 17 - 12 - \left( 0.4 \times 5.0 - \frac{12}{60.0} \times 5.0 \right) - 1$$

$$= 3$$

Similarly for $P_{pt}$ $$P_{pt} = N - V - \left( Y \times T - \frac{V}{S} \times T \right) - X$$

$$= 46 - 43 - \left( 0.1 \times 5.0 - \frac{43}{215.0} \times 5.0 \right) - 1$$

= 2.5

Using the given data, the values of $P_{op}$ and $P_{pt}$ can be determined for the remaining two routes. For route 2, $P_{op}=1.5$ and $P_{pt}=3.0$. For route 3, $P_{op}=3.0$ and $P_{pt}=4.0$.

Each potential alternate route is assigned a characteristic value R such that:

$R = P_{op}$   (for $P_{op} < P_{pt}$);

$R = P_{pt}$   (for $P_{pt} < P_{op}$); and $R = P_{op} = P_{pt}$   (for $P_{pt} = P_{op}$).

The potential tandeming switching office having the largest number R is the one most likely to be chosen as the tandeming switching office (if $R \leq 0$, then that office is not chosen as the tandeming switching office, even if it has the largest absolute R value). In the event that two alternate routes have the same R value, preference is given to the route with the lowest X value. The alternate routes are selected by a random method, based upon the R values, such that the route having the largest positive R value is the one most likely to be chosen.

In more detail, route 1 has an R value of 2.5, route 2 has an R value of 1.5, and route 3 has an R value of 3.0. Plotting these on the line graph below we have:

The line graph runs from 0 to 7.0. A random number generator (part of device 39, FIG. 4) is employed to generate numbers at random between the limits (i.e. 0 and 7.0) of the line graph. As an example, if the random generator produces a number 2.0 then route 1 is chosen; if it produces a number 3.5, then route 2 is chosen, etc. The route having the largest number is not necessarily chosen as the "proper" alternate route but it is the one most likely to be chosen.

From the given example it can be seen that route 3 is the most likely alternate route since its R value is 3.0 which is the largest positive value of R for the three possible routes.

What is claimed is:

1. An alternate routing system for a plurality of telephone switching offices, said system comprising:
   at least one group of trunk lines connecting any one switching office in said system to any other switching office in said system;
   a first plurality of storage locations, at each said switching office, for storing an indication of the terminating office to which a call is directed;
   a second plurality of storage locations, at each said switching office for storing an indication of the switching office most likely to be available as a tandeming office between the originating switching office and the terminating switching office;
   a third plurality of storage locations, at each said switching office, for storing an indication of the trunk lines to be used for accessing the switching office indicated by said second plurality of storage locations as being the tandeming offices; and
   means for periodically updating the information stored in said second plurality of storage locations, concerning the switching office to be employed as a tandeming office.

2. The alternate routing system of claim 1 wherein said second plurality of storage locations is responsive to said first plurality of storage locations; said third plurality of storage locations is responsive to said second plurality of storage locations; and said first plurality of storage locations is responsive to said third plurality of storage locations.

3. The alternate routing system of claim 2, wherein said means for periodically updating the information stored in said second plurality of storage locations is responsive to data from each switching office in said system for determining the most likely alternate routes to each switching office in said system from a designated switching office, and for transmitting to each said designated switching office said most likely alternate routes for each said designated switching office, to be stored in said second plurality of storage locations of each said designated switching office.

4. The alternate routing system of claims 1, 2 or 3, wherein said means is responsive to data from each switching office in said system for determining the alternate route by choosing as the alternate route, that potential alternate route for which the lesser of the quantities ($M_{op}-2$) and ($M_{pt}-2$) is the largest positive quantity, wherein for each potential alternate route: $M_{op}$ is the number of available trunk lines between the originating switching office and a potential tandeming switching office; and $M_{pt}$ is the number of available trunk lines between that potential tandeming switching office and the terminating switching office.

5. The alternate routing system of claims 1, 2 or 3 wherein said means is responsive to data from each switching office in said system for determining the alternate route by choosing the alternate route according to a random method, the probability of which route is to be chosen is based upon the positive R values of the potential alternate routes wherein for each potential alternate route:

$R = P_{op}$   (for $P_{op} < P_{pt}$);

$R = P_{pt}$   (for $P_{pt} < P_{op}$); and $R = P_{op} = P_{pt}$   (for $P_{pt} = P_{op}$);

and wherein for each potential alternate route $P_{op}$ is a quantity assigned to the trunk lines connecting the originating switching office to a potential tandeming switching office and is defined as:

$$P_{op} = N - V - \left( Y \times T - \frac{V}{S} \times T \right) - X$$

where:
  N is the total number of trunk lines between the two considered switching offices;

V is the number of occupied trunk lines between the two considered switching offices;

Y is the total average call intensity for the trunk lines between the two considered switching offices;

T is the length of time of the update period under consideration;

S is the estimated average duration of each occupation of the trunk lines between the two considered switching offices, during the time period under consideration; and X is the expected number of idle trunk lines needed between the two considered switching offices, during the time period under consideration, for other than alternately routed calls;

and wherein for each potential alternate route, $P_{pt}$ is a quantity assigned to the trunk lines connecting that potential tandeming switching office to the terminating office and is defined as:

$$P_{pt} = N - V - \left( Y \times T - \frac{V}{S} \times T \right) - X.$$

6. An alternate routing system for a plurality of telephone switching offices, said system comprising:
at least one group of trunk lines connecting any one switching office in said system to any other switching office in said system;
each said switching office including a first plurality of storage locations, a second plurality of storage locations, and a third plurality of storage locations;
said first plurality of storage locations, at each said switching office, storing, as an addressed location for said second plurality of storage locations, an indication of the terminating office to which a call is directed;
said second plurality of storage locations, at each said switching office, storing, as an addressed location for said third plurality of storage locations, an indication of the switching office most likely to be available as a tandeming office between the originating switching office and the terminating switching office;
said third plurality of storage locations, at each said switching office, storing, as an address location for said first plurality of storage locations, an indication of the trunk lines to be used for accessing the switching office indicated as being the tandeming office by said second plurality of storage locations; and
means for periodically updating the information stored in said second plurality of storage locations, concerning the switching office to be employed as a tandeming office.

7. The alternate routing system of claim 6 wherein said means is responsive to data from each switching office in said system for determining the most likely alternate routes to each switching office in said system from a designated switching office, and for transmitting to each said designated switching office said most likely alternate routes for each said designated switching office, to be stored in said second plurality of storage locations of each said designated switching office.

8. The alternate routing system of claim 7 wherein: said first plurality of storage locations comprises a first storage means; said second plurality of storage locations comprises a second storage means; and said third plurality of storage locations comprises a third storage means.

9. The alternate routing system of claim 8 wherein said storage means are random access memories.

10. The alternate routing system of claims 6, 7 or 8 wherein said means is responsive to data from each switching office in said system for determining the alternate route by choosing as the alternate route, that potential alternate route for which the lesser of the quantities ($M_{op}-2$) and ($M_{pt}-2$) is the largest positive quantity, wherein for each potential alternate route: $M_{op}$ is the number of available trunk lines between the originating switching office and a potential tandeming switching office; and $M_{pt}$ is the number of available trunk lines between that potential tandeming switching office and the terminating switching office.

11. The alternate routing system of claims 6, 7 or 8 wherein said means is responsive to data from each switching office in said system for determining the alternate route by choosing the alternate route according to a random method, the probability of which route is to be chosen is based upon the positive R values of the potential alternate routes wherein for each potential alternate route:

$R = P_{op}$ (for $P_{op} < P_{pt}$);

$R = P_{pt}$ (for $P_{pt} < P_{op}$); and $R = P_{op} = P_{pt}$ (for $P_{pt} = P_{op}$);

and wherein for each potential alternate route $P_{op}$ is a quantity assigned to the trunk lines connecting the originating switching office to a potential tandeming switching office and is defined as:

$$P_{op} = N - V - \left( Y \times T - \frac{V}{S} \times T \right) - X$$

where:
N is the total number of trunk lines between the two considered switching offices;

V is the number of occupied trunk lines between the two considered switching offices;

Y is the total average call intensity for the trunk lines between the two considered switching offices;

T is the length of time of the update period under consideration;

S is the estimated average duration of each occupation of the trunk lines between the two considered switching offices, during the time period under consideration;

X is the expected number of idle trunk lines needed between the two considered switching offices during the time period under consideration for other than alternately routed calls;

and wherein for each potential alternate route $P_{pt}$ is a quantity assigned to the trunk lines connecting that potential tandeming switching office to the terminating office and is defined as:

$$P_{pt} = N - V - \left( Y \times T - \frac{V}{S} \times T \right) - X.$$

12. An alternate routing method for a plurality of telephone switching offices interconnected in a system configuration wherein any two switching offices in said system are interconnected by at least one group of trunk lines, said method, at an originating switching office, comprising:

storing, in a first addressable storage location, an address indicative of a terminating switching office;

storing, in a second addressable storage location addressed by the contents of said first storage location, an address indicative of a tandeming switching office to be employed intermediate said originating and terminating switching offices;

storing, in a third addressable storage location addressed by the contents of said second storage location, an address indicative of trunk lines to be employed in accessing said tandeming switching office; and periodically updating the information stored in said second addressable storage location.

13. The method of claim 12 wherein an alternate route to be employed is chosen by choosing as the alternate route, that potential alternate route for which the lesser of the quantities ($M_{op}-2$) and ($M_{pt}-2$) is the largest positive quantity, wherein: $M_{op}$ is the number of available trunk lines between the originating switching office and a potential tandeming switching office; and $M_{pt}$ is the number of available trunk lines between that potential tandeming switching office and the terminating switching office.

14. The alternate routing method of claim 12, wherein the alternate route that is most likely to be chosen is that alternate route which has the largest positive R value wherein:

$R = P_{op}$     (for $P_{op} < P_{pt}$);

$R = P_{pt}$     (for $P_{pt} < P_{op}$); and $R = P_{op} = P_{pt}$     (for $P_{pt} = P_{op}$);

and wherein for each potential alternate route $P_{op}$ is a quantity assigned to the trunk lines connecting the originating switching office to a potential tandeming switching office and is defined as:

$$P_{op} = N - V - \left( Y \times T - \frac{V}{S} \times T \right) - X$$

where:

N is the total number of trunk lines between the two considered switching offices;

V is the number of occupied trunk lines between the two considered switching offices;

Y is the total average call intensity for the trunk lines between the two considered switching offices;

T is the length of time of an update period under consideration;

S is the estimated average duration of each occupation of the trunk lines between the two considered switching offices, during the time period under consideration;

X is the expected number of idle trunk lines needed between the two considered switching offices during the time period under consideration for other than alternately routed calls;

and wherein for each potential alternate route $P_{pt}$ is a quantity assigned to trunk lines connecting that potential tandeming switching office to the terminating office and is defined as:

$$P_{pt} = N - V - \left( Y \times T - \frac{V}{S} \times T \right) - X.$$

* * * * *